United States Patent
Honda et al.

(10) Patent No.: US 7,453,499 B2
(45) Date of Patent: Nov. 18, 2008

(54) ELECTRIC CAMERA AND SIGNAL AMPLIFICATION RATIO ADJUSTING METHOD FOR THEREFOR

(75) Inventors: Masaya Honda, Fuchu (JP); Makoto Ikeda, Kunitachi (JP); Hitoshi Hashimoto, Sagamihara (JP)

(73) Assignee: Olympus Corporation, Tokyo (JP)

( * ) Notice: Subject to any disclaimer, the term of this patent is extended or adjusted under 35 U.S.C. 154(b) by 753 days.

(21) Appl. No.: 10/855,160

(22) Filed: May 27, 2004

(65) Prior Publication Data

US 2005/0036040 A1    Feb. 17, 2005

(30) Foreign Application Priority Data

May 28, 2003    (JP) .............................. 2003-151097

(51) Int. Cl.
   *H04N 9/73*    (2006.01)
   *H04N 5/235*   (2006.01)
(52) U.S. Cl. .................. 348/223.1; 348/229.1
(58) Field of Classification Search ... 348/221.1–229.1, 348/362–366; 358/515–516
   See application file for complete search history.

(56) References Cited

U.S. PATENT DOCUMENTS

| | | | |
|---|---|---|---|
| 6,285,398 B1 * | 9/2001 | Shinsky et al. | 348/223.1 |
| 6,522,353 B1 * | 2/2003 | Saito et al. | 348/223.1 |
| 6,795,115 B1 * | 9/2004 | Okazaki | 348/223.1 |
| 6,836,288 B1 * | 12/2004 | Lewis | 348/229.1 |
| 6,995,791 B2 * | 2/2006 | Skow | 348/223.1 |
| 7,030,913 B2 * | 4/2006 | Ikeda | 348/223.1 |
| 7,133,071 B2 * | 11/2006 | Takeuchi | 348/223.1 |
| 7,196,724 B2 * | 3/2007 | Suzuki et al. | 348/223.1 |
| 7,236,191 B2 * | 6/2007 | Kalevo et al. | 348/222.1 |
| 7,245,320 B2 * | 7/2007 | Kaplinsky et al. | 348/229.1 |
| 7,304,668 B2 * | 12/2007 | Ichikawa et al. | 348/223.1 |
| 2003/0098914 A1 * | 5/2003 | Easwar | 348/229.1 |

FOREIGN PATENT DOCUMENTS

JP    7-284118    10/1995

* cited by examiner

*Primary Examiner*—David Ometz
*Assistant Examiner*—Pritham Prabhakher
(74) *Attorney, Agent, or Firm*—Straub and Pokotylo; John C. Pokotylo

(57) ABSTRACT

In an electronic camera according to the present invention, an electric charge is stored in a CCD as a light receiving signal having at least color information with respect to received light beams. Standard color information is acquired by an imaging circuit and a main CPU from the light receiving signal obtained by driving the CCD in such a manner that a stored electric charge quantity to be stored in the CCD becomes a predetermined quantity. On the other hand, reference color information is acquired from light receiving information obtained by driving the CCD. An application range of an amplification ratio of the light receiving signal determined based on the reference color information with respect to the standard color information is stored in a detachable memory.

20 Claims, 7 Drawing Sheets

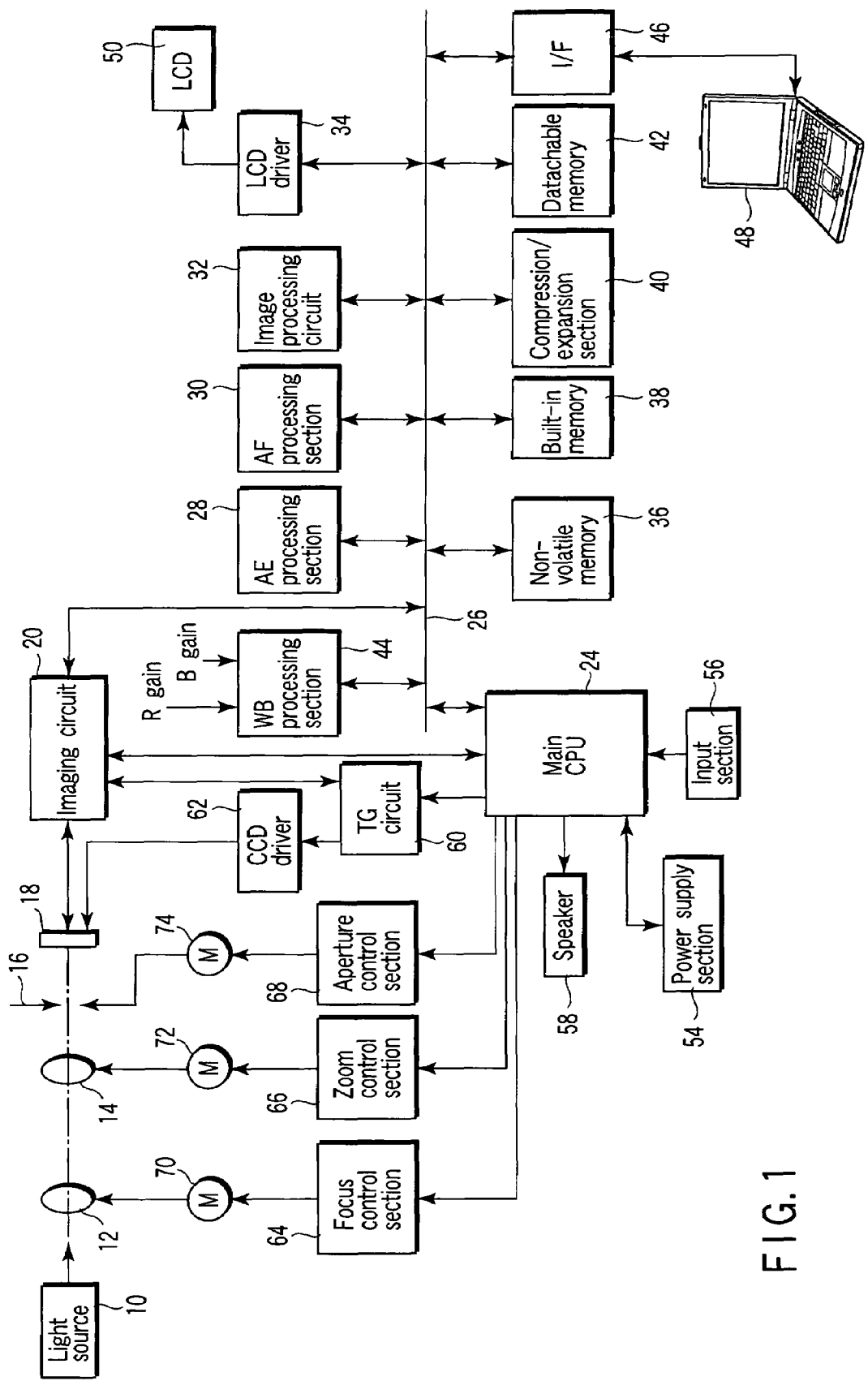
F I G. 1

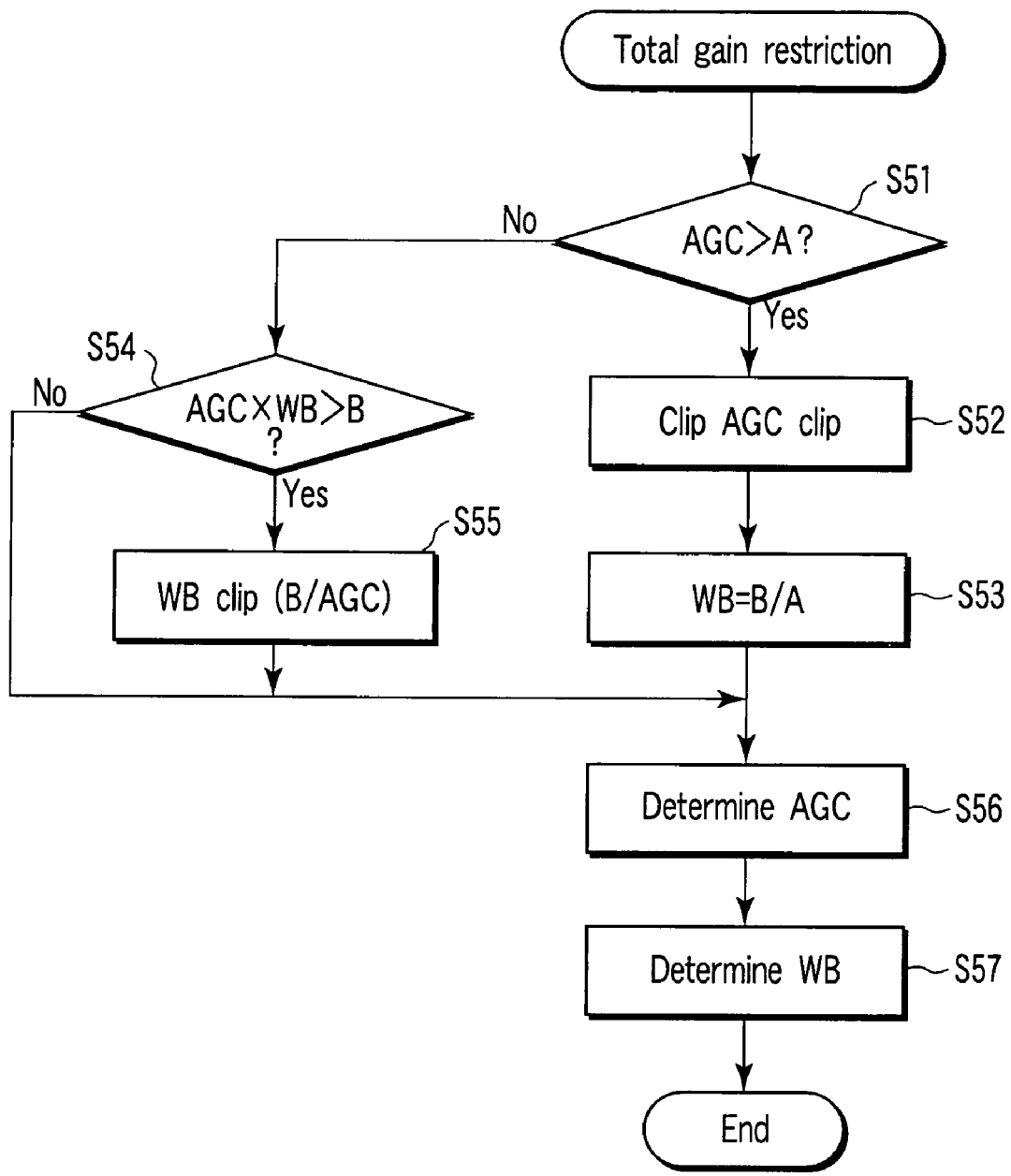
F I G. 9

ELECTRIC CAMERA AND SIGNAL AMPLIFICATION RATIO ADJUSTING METHOD FOR THEREFOR

CROSS-REFERENCE TO RELATED APPLICATIONS

This application is based upon and claims the benefit of priority from the prior Japanese Patent Application No. 2003-151097, filed May 28, 2003, the entire contents of which are incorporated herein by reference.

BACKGROUND OF THE INVENTION

1. Field of the Invention

The present invention relates to an electronic camera and signal amplification ratio adjusting method for the electronic camera in which a gain utilization area is restricted to an area in which mixed colors are indistinctive.

2. Description of the Related Art

In a video camera or an electronic camera, a white balance control is executed in such a manner that a white reproduced image can be obtained when a white subject is photographed. This is executed by performing gain adjustment with a red signal, a blue signal and a green signal of a CCD in a camera being determined as references.

Further, in an image integration type auto white balance circuit, control is effected based on information that achromatic colors are obtained when color signal components in an entire imaging screen are integrated. Specifically, a red integration value IR, a green integration value IG and a blue integration value IB are obtained by respectively integrating a red signal R, a green signal G and a blue signal B in accordance with each field, and a ratio IR/IG of the red integration value IR with respect to the green integration value IG and a ratio IB/IG of the blue integration value IB with respect to the green integration value IG are calculated.

Then, white-balance balance control signals Rcont and Bcont with which the following expression can be achieved are obtained.

$$(IR/IG)=(IB/IG)=1$$

Furthermore, the gain of the red signal R is adjusted in accordance with a value of the control signal Rcont, and the gain of the blue signal B is adjusted in accordance with a value of the control signal Bcont, thereby controlling the white balance.

BRIEF SUMMARY OF THE INVENTION

It is an object of the present invention to provide an electronic camera and a signal amplification ratio adjusting method for the electronic camera which can perform appropriate color adjustment even with a low illumination intensity.

A first characteristic of the present invention is to provide an electronic camera comprising:

an imaging section which stores an electric charge as a light receiving signal having at least color information with respect to received light beams;

a standard color information acquisition section which acquires standard color information from the light receiving signal obtained by driving the imaging section in such a manner that a stored electric charge quantity to be stored in the imaging section becomes a predetermined quantity;

a reference color information acquisition section which acquires reference color information from the light receiving signal obtained by driving the imaging section in such a manner that a stored electric charge quantity becomes different from that of the standard color information acquisition section; and a storage section which stores an application range of an amplification ratio of the light receiving signal which is determined based on the reference color information with respect to the standard color information as a standard.

A second characteristic of the present invention is provide a signal amplification ratio adjusting method for an electronic camera comprising:

a first step of acquiring color information of a standard photography condition in such a manner that a stored electric charge quantity to be stored in an imaging section becomes a predetermined quantity;

a second step of acquiring color information of a low-output photography condition different from the standard photography condition in such a manner that the stored electric charge quantity becomes different;

a third step of judging an application range of an amplification ratio of a light receiving signal based on the color information acquired at the first step and the color information acquired at the second step; and a fourth step of storing the application range of the amplification ratio of the light receiving signal judged at the third step.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a structure of an electronic camera according to a first embodiment of the present invention;

FIG. 9 is a flowchart illustrating a total gain restriction operation of an electronic camera according to a third embodiment of the present invention.

DETAILED DESCRIPTION OF THE INVENTION

Figure 2:
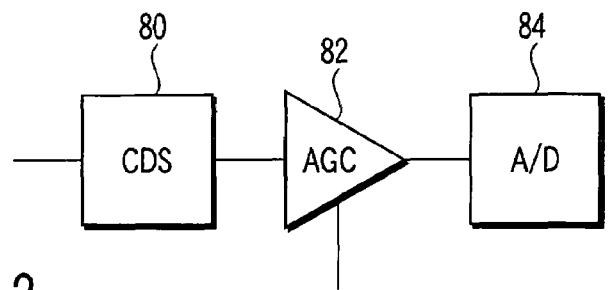
FIG. 2 is a block diagram showing a structure of an imaging circuit 20 depicted in FIG. 1.

Embodiments according to the present invention will now be described hereinafter with reference to the accompanying drawings.

First Embodiment

FIG. 1 is a block diagram showing a structure of an electronic camera according to a first embodiment of the present invention.

In FIG. 1, a light image from a light source 10 is formed on an imaging surface of a charge-coupled device (CCD) 18 as a solid-state image sensing device through a focus lens 12, a zoom lens 14 and an aperture diaphragm 16. The CCD 18 stores an electric charge for each pixel in an exposure time and photoelectrically converts it, and a signal of the photoelectrically converted light image is supplied to a main CPU 24 from an imaging circuit 20 through a bus 26. It is to be noted that the light source 10 is configured to have a color temperature conversion filter and a light quantity adjustment function. The imaging circuit 20 has an analog-to-digital converter, an auto gain controller (AGC) setting section and others therein.

The main CPU 24 collectively controls the entire electronic camera. To the main CPU 24 are connected an AE processing section 28, an AF processing section 30, an image processing circuit 32, an LCD driver 34, a nonvolatile memory 36, a built-in memory 38, a compression/expansion section 40, a detachable memory 42, a white balance (WB) processing section 44 and an interface (I/F) circuit 46 through the bus 26, and the imaging circuit 20 is also connected to the main CPU 24.

The AE processing section 28 has a function to perform automatic exposure (AE) processing at the time of photography. Likewise, the AF processing section 30 has a function to carry out auto focus (AF) processing at the time of photography.

The image processing circuit 32 is used to apply various kinds of processing to an image which is displayed in an later-described LCD 50 or an image which is recorded in the detachable memory 42 or read from the detachable memory 40. Further, the nonvolatile memory 36 is constituted of, e.g., an EEPROM, and a control program which is used to perform a collective operation of the respective circuits is stored in this memory.

The built-in memory 38 is used to temporarily store a video signal (light receiving signal) output from the imaging circuit 20. Further, the video signal stored in this built-in memory 38 is displayed in the liquid crystal display (LCD) 50 driven by the LCD driver 34 through an image processing circuit 32 or the like.

Furthermore, the video signal stored in the built-in memory 38 is also read to the compression/expansion section 40. After a data quantity of the video signal is appropriately compressed by a compression method specified by this compression/expansion section 40, the video signal is recorded and saved in the detachable memory 42 which can be attached/detached and is constituted of a flash memory or the like.

Incidentally, when the video signal saved in this detachable memory 42 is read in a reproduction mode, the video signal is uncompressed by processing opposite to that at the time of recording by the compression/expansion section 40 and restored to a bit map type video signal. The thus obtained video signal is stored in the built-in memory 38, and then displayed and output to the LCD 50.

The white balance processing section 44 has a function to perform processing such as detecting a white balance from the video signal read from the CCD 18 through the imaging circuit 20 and adjusting it to have an appropriate value.

Moreover, to the main CPU 24 are connected a power supply section 54 which is used to supply a necessary power to each section in this electronic camera, an input section 56 constituted of a release switch, various mode switches, any other operation switches and others and a speaker 58, and a CCD driver 62 and the imaging circuit 20 are connected to the main CPU 24 through a timing generation (TG) circuit 60.

The timing generation circuit 60 outputs various kinds of timing signals including an electric charge sweeping pulse and a reading pulse based on a vertical synchronization signal VD output from a non-illustrated synchronization signal generator. These timing signals are supplied to the imaging circuit 20 the CCD driver 62 which drives and the CCD 18.

Additionally, a focus control section 64, a zoom control section 66 and an aperture control section 68 are connected to the main CPU 24. The focus control section 64, the zoom control section 66 and the aperture control section 68 are used to respectively control a motor 70 which drives the focus lens 12, a motor 72 which drives the zoom lens 14, and a motor 74 which drives the aperture diaphragm 16.

It is to be noted that this electronic camera can communicate with a personal computer 48 which is connected with the outside through an interface (I/F) section 46.

FIG. 2 is a block diagram showing a structure inside the imaging circuit 20.

An output from the CCD 18 is first sampled by a CDS 80, and then amplified by using a gain given by the AGC 82. Subsequently, A/D conversion is carried out in an A/D converter 84, and a result is output to each processing circuit.

An operation of the embodiment will now be described.

Figure 3:
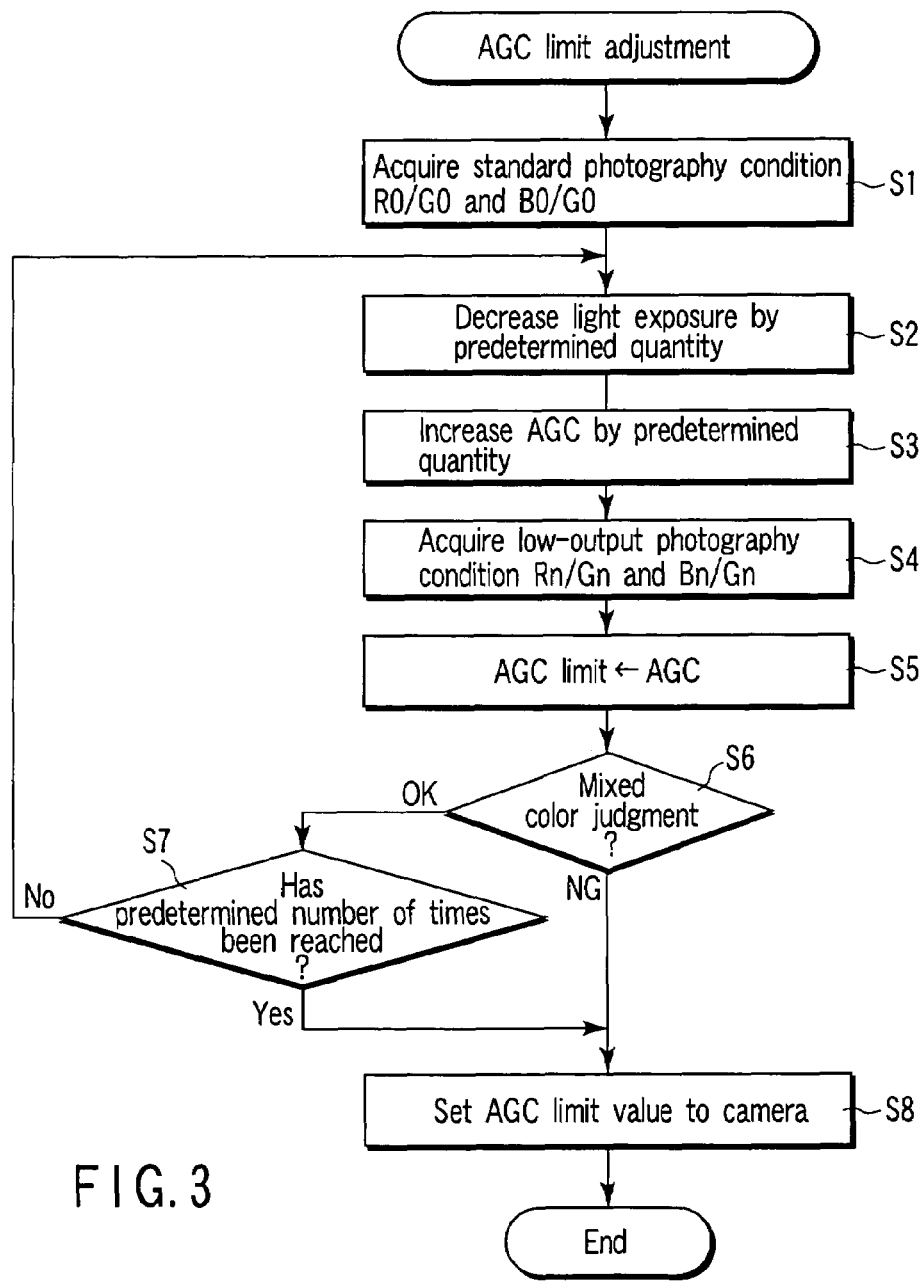
FIG. 3 is a flowchart illustrating an operation to adjust a gain given to an AGC 82.

FIG. 3 is a flowchart illustrating an operation to adjust a gain given to such a AGC 82. This operation is carried out in order to obtain a gain level on which mixed colors become distinctive.

When the AGC limit adjustment starts, a ratio R0/G0 which is an initial value ratio of a component of a red signal and a component (R) of a green signal (G) and a ratio B0/G0 which is an initial value ratio of a component (B) of a blue signal and a component (G) of a green signal are first acquired as a preset intermediate standard photography condition at step S1. Here, the standard photography condition means a photography condition with which mixed colors are indistinctive, e.g., a standard color temperature, a standard exposure condition, a standard AGC gain and others. Further, the ratio R0/G0 and the ratio B0/G0 can be acquired when the respective color signals obtained in the imaging circuit 20 are calculated by, e.g., the main CPU 24 with respect to those temporarily stored in the built-in memory 38.

Then, at step S2, a light exposure is decreased to be lower than the intermediate standard photography condition by a predetermined quantity. Furthermore, at step S3, in response to the lowered light exposure, a gain of the AGC 82 is increased by a predetermined quantity.

Figures 4, 5:
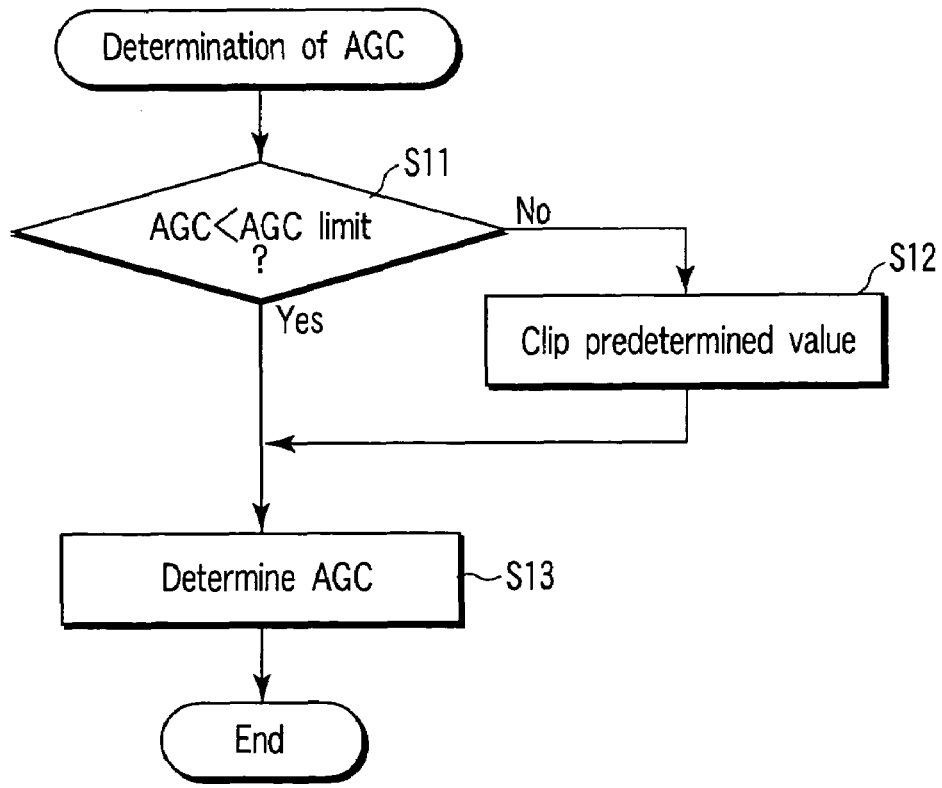
FIG. 4 is a view showing an example of a relationship between a light exposure and a quantity of the AGC which are increased/decreased at steps S2 and S3 in the flowchart of FIG. 3.
FIG. 5 is a flowchart illustrating an operation to determine the AGC by using an AGC limit value.

FIG. 4 is a view showing an example of a relationship between a light exposure and an AGC gain value which are increased/decreased at steps S2 and S3. Here, the light exposure can be changed by a method of changing a storage time of the CCD 18 with a light receiving quantity of the CCD 18 being determined as a fixed value, a method of decreasing a light receiving quantity of the CCD 18 by using an ND filter without changing the storage time.

At step S4, when the condition is changed, ratios Rn/Gn and Bn/Gn under, e.g., the low-output photography condition can be obtained. Then, at step S5, a current gain value of the AGC is set (stored) as an AGC limit.

Furthermore, at step S6, a mixed color judgment is carried out. Here, the judgment of mixed colors is carried out based on the ratios R0/G0 and B0/G0 and the ratios Rn/Gn and Bn/Gn acquired at steps S1 and S4 mentioned above. One of judgment examples is as follows.

$$|(R0/G0 - Rn/Gn)| \leq \alpha, \alpha > 0$$

The judgment upon whether a result is NG or OK is carried out based on this.

Moreover, another judgment example is effected as the following expressions.

$$\alpha 1 \leq (R0/G0)/(Rn/Gn) \leq \alpha 2$$

and $\alpha 1 \neq \alpha 2, 0 < \alpha 1 < \alpha 2$

It is to be noted that this mixed color judgment is not restricted to the above-described judgment examples.

When the mixed color judgment result is OK, i.e., the influence of mixed colors is small at step S6, a judgment is made upon whether the mixed color judgment is carried out for a predetermined number of times. If the judgment is yet to reach a predetermined number of times, the processing advances to step S2, and the above-described processing is repeated. On the other hand, when the mixed color judgment is carried out for the predetermined number of times and when NG is determined at step S6, the processing proceeds to step S8. The result of mixed color judgment being NG means that there is a judgment that the mixed colors become distinctive with a gain at this moment.

Therefore, at step S8, an AGC limit value (gain) when NG is obtained or an AGC gain value obtained when the mixed color judgment is carried out for the predetermined number of times is set in the camera. That is, it is stored in the nonvolatile memory 36.

Generation of mixed colors will now be described. With realization of a finer CCD or of high pixels in recent years, a transfer failure of a signal charge occurs due to, e.g., a reset defect of a CCD horizontal transfer path, a deterioration in horizontal transfer efficiency, a degradation in a low-illumination intensity linearity and others, and mixed colors are apt to be generated between pixels. In particular, mixed colors become distinctive when a ratio of an image signal becomes high with a low-illumination intensity.

Giving a description on this in terms of a reset operation of the CCD, when an electric charge for each pixel stored in the CCD is read, no mixed color is generated if the CCD horizontal transfer path is completely reset. However, reset of the CCD horizontal transfer path is incomplete, mixed colors are produced. At this time, since a percentage of the electric charge which remains due to incomplete reset is small with respect to an output when an illumination intensity is high, mixed colors are indistinctive. However, since this percentage becomes large when the illumination intensity is low, mixed colors become distinctive.

According to the foregoing embodiment, when an application range of the gain value of the AGC is restricted with respect to such mixed colors, mixed colors of the video signal can be avoided.

FIG. 5 is a flowchart illustrating an operation to determine a gain value of the AGC by using the thus acquired AGC limit value.

At step S11, a gain value of the AGC obtained from the AE processing section 28 or the like is compared with the AGC limit value acquired in the flowchart of FIG. 3. If the gain value of the AGC is larger than the AGC limit value as a result of comparison, the processing advances to step S12. Then, at step S12, the gain value is clipped to a predetermined value (e.g., AGC limit value $-\beta$, $0 \leq \beta$).

On the other hand, when the value of the AGC is smaller than the AGC limit value at step S11, and after step S12, the processing advances to step S13, and the gain value of the AGC is determined as it is.

The application range of the gain of the light receiving signal determined in this manner is calculated in the main CPU 24 or in the personal computer connected with this electronic camera through the interface section 46.

Second Embodiment

A second embodiment of the present invention will now be described.

It is to be noted that a structure of the second embodiment is the same as that of the first embodiment mentioned above. Therefore, like reference numerals denote parts equal to those in FIGS. 1 and 2, and the illustration and the description of these parts will be eliminated, and the description will be given as to different operations alone.

Figure 6A:
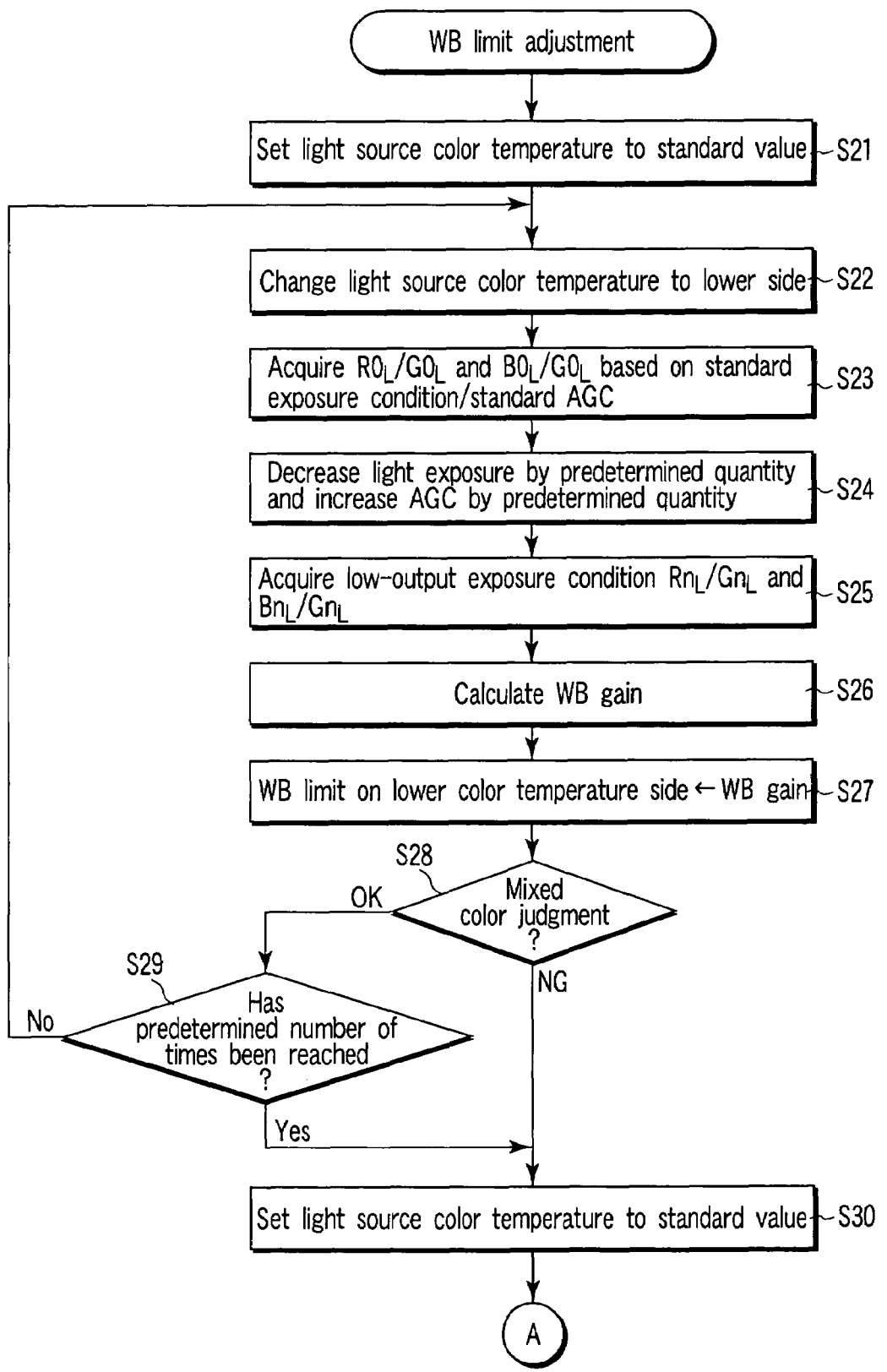
FIGS. 6A and 6B are flowcharts illustrating an operation of white balance (WB) limit adjustment of an electronic camera according to a second embodiment of the present invention.
Figure 6B:
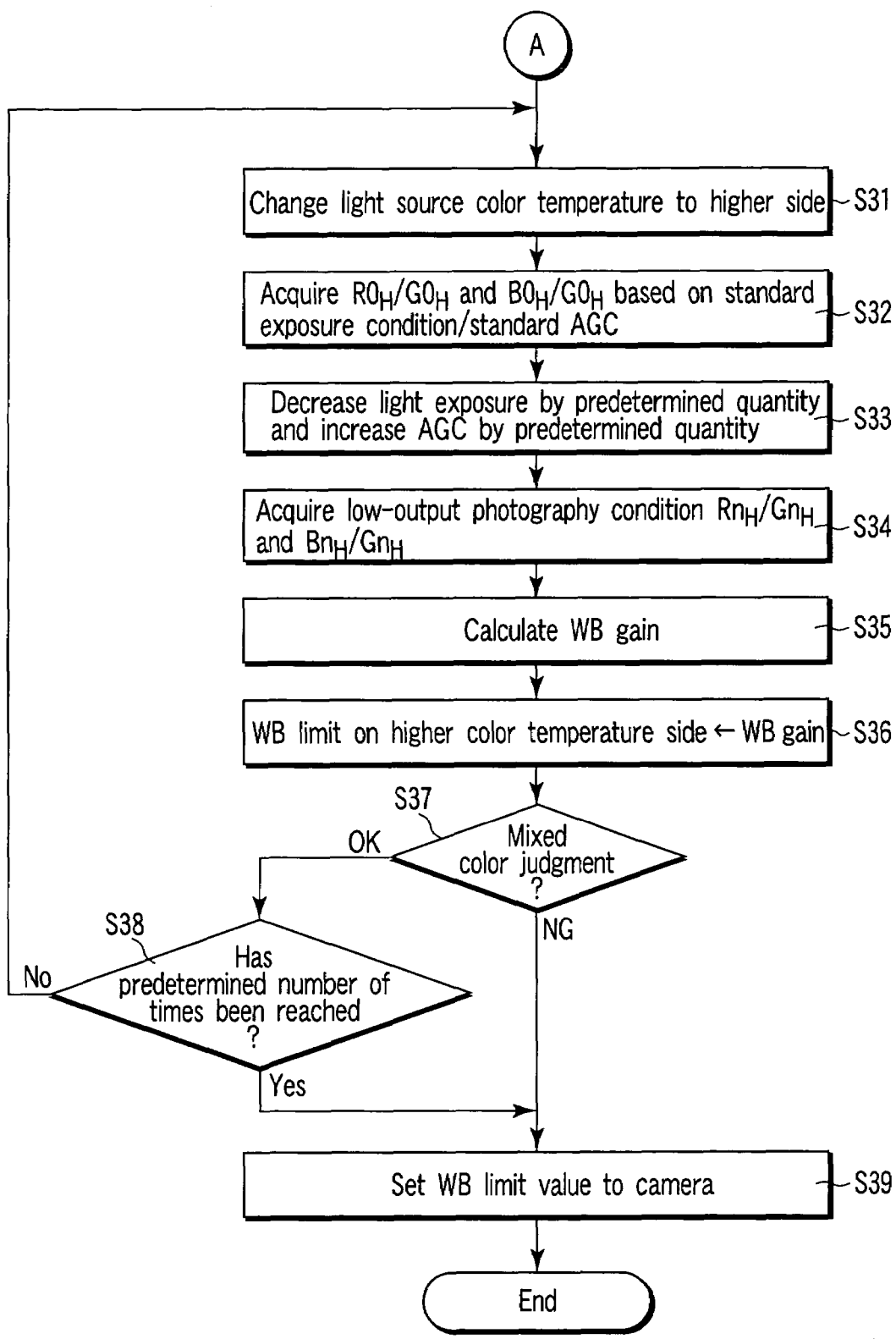

FIGS. 6A and 6B are flowcharts illustrating an operation of white balance (WB) limit adjustment of an electronic camera according to the second embodiment of the present invention.

First, at step S21, a color temperature of the light source 10 is set to a standard value. Then, at step S22, the color temperature of the light source 10 is lowered by a predetermined value. Further, at step S23, as a preset intermediate standard exposure condition, ratios of R0L/G0L and B0L/G0L are acquired with a standard AGC gain.

Incidentally, as to the standard exposure condition, the above-described ratios are acquired like the first embodiment mentioned above. Furthermore, it is good enough to change the color temperature by using, e.g., a color temperature conversion filter.

At step S24, a light exposure is decreased to be lower than the intermediate standard exposure condition by a predetermined quantity. At the same time, the gain of the AGC is increased by a predetermined quantity in response to the decreased light exposure. Then, at step S25, ratios RnL/GnL and BnL/GnL as a low-output exposure condition are obtained. Here, in regard to RnL/GnL, BnL/GnL and the light exposure, using such a method as described in the first embodiment can suffice.

Moreover, at step S26, a gain of the white balance is calculated. Subsequently, at step S27, a gain of the white balance is set to the white balance limit on the lower color temperature side.

Then, at step S28, a mixed color judgment is carried out. For example, a judgment example is as follows.

$$|(B0L/G0L - BnL/GnL)| \leq \alpha L, \alpha L > 0$$

A judgment whether a result is NG or OK is performed based on this expression.

Here, if a result of the judgment is OK, i.e., if the influence of mixed colors is small, the processing advances to step S29, and a judgment is made upon whether the mixed color judgment is carried out for a predetermined number of times. Here, if the predetermined number of times is not reached, the processing proceeds to step S22, and the above-described processing is repeated. On the other hand, when the predetermined number of time is reached, and when a result of the mixed color judgment is NG at step S28, i.e., if the influence of mixed colors is large, the processing advances to step S30.

At step S30, the color temperature of the light source 10 is again set to the standard value. Then, at step S31, the color temperature of the light source 10 is changed to be higher by a predetermined value in contradiction to the operation at step S22. Subsequently, at step S32, as a preset intermediate standard exposure condition, ratios of R0H/G0H and B0H/G0H are acquired with a standard AGC gain.

At step S33, the light exposure is decreased to be lower than the intermediate standard exposure condition by a predetermined quantity, and the gain of the AGC is increased by a predetermined quantity in response to the decreased light exposure. Then, at step S34, ratios RnH/GnH and BnH/GnH as a low-output exposure condition are obtained.

Further, at step S35, a gain of the white balance is calculated. Subsequently, at step S36, the gain of the white balance is set to the white balance limit value on the higher color temperature side.

Then, at step S37, a mixed color judgment is carried out. For instance, a judgment example is as follows.

$|(R0H/G0H-RnH/GnH)| \leq \alpha H, \alpha H > 0$

A judgment is made upon whether a result is NG or OK based on this expression.

Here, a result of the judgment is OK, the processing advances to step S38, and a judgment is made upon whether the mixed color judgment is carried out for a predetermined number of times. Here, if the predetermined number is not reached, the processing proceeds to step S31, and the above-described processing is repeated. On the other hand, when the predetermined number of times is reached and when a result of the mixed color judgment is NG at step S37, the processing advances to step S39.

Then, at step S39, respective limit values (gains) of the white balance when the result is NG on the higher color temperature side and the lower color temperature side are set in the camera, i.e., stored in the non-volatile memory 36.

Figure 7:
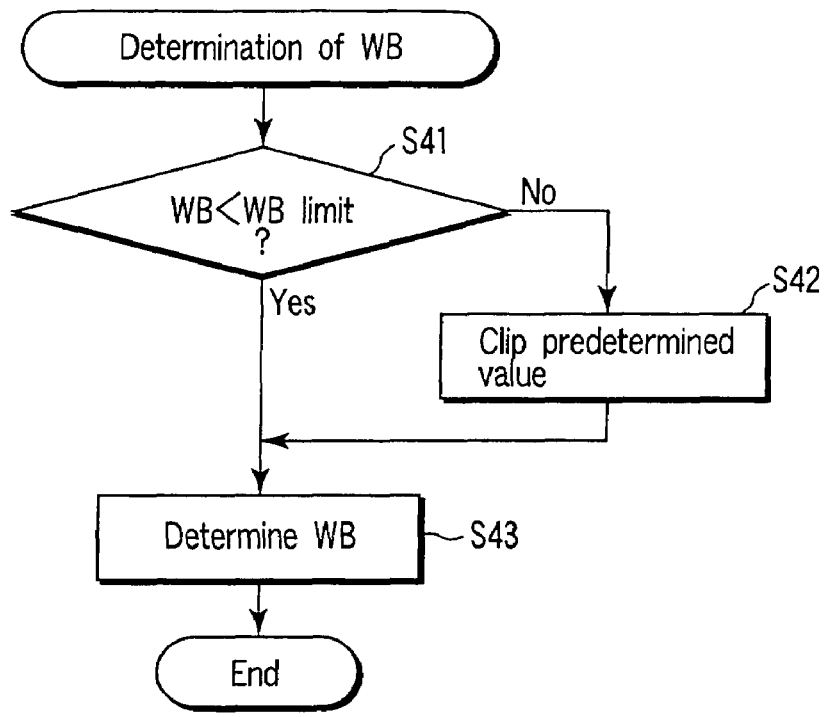
FIG. 7 is a flowchart illustrating an operation to determine a white balance gain by using a white balance limit value.

FIG. 7 is a flowchart illustrating an operation to determined the white balance by using the thus acquired white balance limit value.

At step S41, a value of the white balance obtained from the AE processing section 28 or the like is compared with each limit value of the white balance obtained through the flowcharts illustrated in FIGS. 6A and 6B. As a result, if the gain value of the white balance is larger than each limit value of the white balance, the processing advances to step S42, the gain value is clipped to a predetermined value (e.g., the white balance limit value $-\beta, 0 \leq \beta$).

On the other hand, at step S41, if the gain value of the white balance is smaller than the white balance limit value, and after step S42, the processing proceeds to step S43, and the gain value of the white balance is determined as it is.

It is to be noted that the above-described white balance limit adjustment is executed by the imaging circuit 20 like the case of the AGC limit adjustment.

Figure 8:
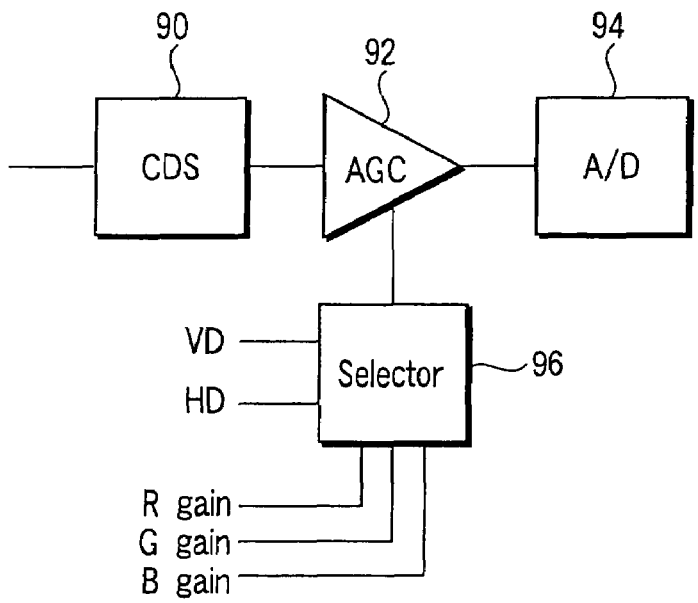
FIG. 8 is a block diagram showing a structure of an imaging circuit 20 which executes white balance limit adjustment.

FIG. 8 is a block diagram showing a structure of the imaging circuit 20 which executes the above-described white balance limit adjustment.

An output from the CCD 18 is first sampled by the CDS 90, and then amplified by using a gain given by the AGC 92. To this AGC 92 is supplied an output from a selector 96 which is used to select one of an R gain, a G gain and a B gain by using a vertical synchronization signal VD and a horizontal synchronization signal HD from a non-illustrated synchronization generator. Therefore, in the AGC 92, the output is amplified with the gain given for each of a red signal (R), a green signal (G) and a blue signal (B). Then, it is analog-to-digital-converted by the A/D converter 94 and output to each processing circuit.

It is to be noted that this white balance limit adjustment may be executed in the white balance (WB) processing section 44 in place of the imaging circuit 20. Furthermore, $\alpha L$ and $\alpha H$ mentioned above may have the same value.

Third Embodiment

A total gain restricting operation of an electronic camera according to a third embodiment of the present invention will now be described with reference to a flowchart of FIG. 9.

Incidentally, since a structure of the third embodiment is the same as that of the first embodiment mentioned above, like reference numerals denote parts equal to those in FIGS. 1 and 2, their illustration and explanation will be eliminated, and a description will be given as to different operations alone.

First, at step S51, a gain value of the AGC is compared with a predetermined value A. Here, if the gain value of the AGC is larger than the predetermined value, the processing advances to step S52. However, if it is not larger, the processing proceeds to step S54.

At step S54, a value obtained by multiplying the AGC gain by a white balance gain is compared with a predetermined value B. If the value obtained by multiplying the AGC gain by the white balance gain is larger as a result of comparison, the processing advances to step S55. However, if it is not larger, the original obtained value is used, and the processing proceeds to later-described step S56.

Here, the predetermined value A and the predetermined value B mentioned above are values which are set based on the AGC gain and the white balance limit value, respectively. Moreover, the predetermined value A may be equal to the predetermined value B.

At step S55, the gain value of the white balance is clipped. On the other hand, at step S52, the gain value of the AGC is clipped. It is to be noted that the white balance remains as it is in this case. Then, at step S53, the gain value of the white balance is determined as a predetermined value B/A.

Then, at step S56, the AGC gain is determined as one of the above-described values. Subsequently, at step S57, the white balance gain is determined, and this routine is terminated.

In this manner, when the application range of the gain is restricted, the influence of mixed colors of the video signal can be reduced.

It is to be noted that the present invention is not restricted to the foregoing embodiments, and it can be modified and carried out in many ways without departing from the scope of the invention.

As described above, according to the present invention, it is possible to provide an electronic camera and a signal amplification ratio adjusting method for the electronic camera which can perform appropriate color adjustment even when an illumination intensity is low.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An electronic camera comprising:
   an imaging section which stores an electric charge as a light receiving signal having at least color information with respect to received light beams;
   a standard color information acquisition section which acquires standard color information indicating a ratio between color signals, from the light receiving signal obtained by driving the imaging section in such a manner that a stored electric charge quantity to be stored in the imaging section becomes a predetermined quantity;
   a reference color information acquisition section which acquires reference color information indicating a ratio between different color signals, from the light receiving signal obtained by driving the imaging section in such a manner that the stored electric charge quantity is lower than that of the standard color information acquisition section; and
   a storage section which stores an application range of an amplification ratio of the light receiving signal determined based on the reference color information with respect to the standard color information.

2. The electronic camera according to claim 1, wherein the light receiving signal has a brightness signal, and an application range of an amplification ratio of the brightness signal is determined based on the reference color information with respect to the standard color information.

3. The electronic camera according to claim 1, wherein the light receiving signal has a plurality of color signals, and an application range of an amplification ratio of each of the plurality of color signals is determined based on the reference color information with respect to the standard color information.

4. The electronic camera according to claim 1, further comprising:
   a signal processing section which performs signal processing based on the light receiving signal obtained by the imaging section,
   wherein the signal processing section sets an application range of at least one of an amplification ratio of the imaging section and an amplification ratio of the signal processing section based on the reference color information with respect to the standard color information.

5. The electronic camera according to claim 1, further comprising an arithmetic operation section which performs an arithmetic operation to determine an application range of an amplification ratio of the light receiving signal to be stored in the storage section.

6. The electronic camera according to claim 1, wherein the arithmetic operation to determine the application range of the amplification ratio of the light receiving signal to be stored in the storage section is carried out by an external device of the electronic camera connected through an interface.

7. The electronic camera according to claim 1, wherein the reference color information acquisition section acquires a plurality of sets of reference color information by switching drive conditions of the imaging section, and
   the storage section stores the application range of the amplification ratio of the light receiving signal determined based on the plurality of sets of reference color information.

8. The electronic camera according to claim 1, wherein the standard color information acquisition section and the reference color information acquisition section respectively acquire a plurality of sets of color information, and the storage section stores an application range of an amplification ratio of the light receiving signal determined for each of the plurality of sets of color information.

9. The electronic camera according to claim 1, wherein the color information is composed of an R/G ratio which is a ratio of a component (R) of a red signal and a component (G) of a green signal and a B/G ratio which is a ratio of a component (B) of a blue signal and the component (G) of the green signal.

10. A signal amplification ratio adjusting method for an electronic camera, comprising:
    a first step of obtaining color information of a standard photography condition, which indicates a ratio between different color signals, in such a manner that a stored electric charge quantity to be stored in an imaging section becomes a predetermined quantity;
    a second step of obtaining color information of a low-output photography condition different from the standard photography condition in such a manner the stored electric charge quantity becomes different;
    a third step of judging an application range of an amplification ratio of a light receiving signal based on the color information obtained at the first step and the color information obtained at the second step; and
    a fourth step of storing the application range of the amplification ratio of the light receiving signal judged at the third step.

11. A signal amplification ratio adjusting method for an electronic camera, comprising:
    a first step of comparing color information of a standard photography condition, which indicates a ratio between different color signals, with a first predetermined value in such a manner that a stored electric charge quantity to be stored in an imaging section becomes a predetermined quantity;
    a second step of comparing the color information of the standard photography condition with a second predetermined value different from the first predetermined value based on color information of a low-output photography condition different from the standard photography condition;
    a third step of judging an application range of an amplification ratio of the light receiving signal based on a comparison result of the first step and a comparison result of the second step; and
    a fourth step of storing the application range of the amplification ratio of the light receiving signal judged at the third step.

12. An electronic camera comprising:
    imaging means for storing an electric charge as a light receiving signal having at least color information with respect to received light beams;
    standard color information acquiring means for acquiring standard color information indicating a ratio between different color signals, from the light receiving signal obtained by driving the imaging means in such a manner that a stored electric charge quantity to be stored in the imaging means becomes a predetermined quantity;
    reference color information acquiring means for acquiring reference color information indicating a ratio between different color signals, from the light receiving signal obtained by driving the imaging means in such a manner that the stored electric charge quantity becomes lower than that of the standard color information acquiring means; and
    storing means for storing an application range of an amplification ratio of the light receiving signal determined based on the reference color information with respect to the standard color information.

13. The electronic camera according to claim 12, wherein the light receiving signal has a brightness signal, and an application range of an amplification ratio of the brightness signal is determined based on the reference color information with respect to the standard color information.

14. The electronic camera according to claim 12, wherein the light receiving signal has a plurality of color signals, and an application range of an amplification ratio of each of the plurality of color signals is determined based on the reference color information with respect to the standard color information.

15. The electronic camera according to claim 12, further comprising:
 signal processing means for performing signal processing based on the light receiving signal obtained by the imaging means,
 wherein the signal processing means sets an application range of at least one of an amplification ratio of the imaging means and an amplification ratio of the signal processing means based on the reference color information with respect to the standard color information.

16. The electronic camera according to claim 12, further comprising arithmetic operation performing means for performing an arithmetic operation to determine an application range of an amplification ratio of the light receiving signal to be stored in the storing means.

17. The electronic camera according to claim 12, wherein the arithmetic operation to determine an application range of an amplification ratio of the light receiving signal to be stored in the storing means is carried out by an external device of the electronic camera connected through an interface.

18. The electronic camera according to claim 12, wherein the reference color information acquiring means acquires a plurality of sets of reference color information by switching drive conditions of the imaging means, and
 the storing means stores an application range of an amplification ratio of the light receiving signal determined based on the plurality of sets of reference color information.

19. The electronic camera according to claim 12, wherein the standard color information acquiring means and the reference color information acquiring means respectively acquire a plurality of sets of color information, and
 the storing means stores an application range of an amplification ratio of the light receiving signal determined for each of the plurality of sets of color information.

20. The electronic camera according to claim 12, wherein the color information is composed of an R/G ratio which is a ratio of a component (R) of a red signal and a component (G) of a green signal and a B/G ratio which is a ratio of a component (B) of a blue signal and the component (G) of the green signal.

* * * * *